US012674934B2

(12) United States Patent
Oh et al.

(10) Patent No.: US 12,674,934 B2
(45) Date of Patent: Jul. 7, 2026

(54) LOW REFRACTIVE INDEX RESIN COMPOSITION FOR TPP NANO 3D PRINTING AND PHOTONIC WIRE BONDING METHOD USING THE SAME

(71) Applicant: LUVANTIX ADM., CO. LTD, Yuseong-gu (KR)

(72) Inventors: Jung Hyun Oh, Daejeon (KR); Eun Jeong Hahm, Seoul (KR)

(73) Assignee: LUVANTIX ADM., CO. LTD, Yuseong-gu (KR)

(*) Notice: Subject to any disclaimer, the term of this patent is extended or adjusted under 35 U.S.C. 154(b) by 417 days.

(21) Appl. No.: 18/259,147

(22) PCT Filed: Dec. 1, 2022

(86) PCT No.: PCT/KR2022/019347
§ 371 (c)(1),
(2) Date: Jun. 23, 2023

(87) PCT Pub. No.: WO2024/117323
PCT Pub. Date: Jun. 6, 2024

(65) Prior Publication Data
US 2025/0004199 A1 Jan. 2, 2025

(30) Foreign Application Priority Data
Nov. 28, 2022 (KR) ........................ 10-2022-0161557

(51) Int. Cl.
*G02B 6/122* (2006.01)
*C08F 2/50* (2006.01)
(Continued)

(52) U.S. Cl.
CPC .............. *G02B 6/1221* (2013.01); *C08F 2/50* (2013.01); *C08F 290/062* (2013.01); *G02B 6/1228* (2013.01); *G02B 6/138* (2013.01)

(58) Field of Classification Search
None
See application file for complete search history.

(56) References Cited

U.S. PATENT DOCUMENTS

2022/0064427 A1 3/2022 Oakdale et al.

FOREIGN PATENT DOCUMENTS

KR 10-2016-0137929 A 12/2016
KR 10-2353598 B1 1/2022
(Continued)

OTHER PUBLICATIONS

International Search Report and Written Opinion mailed Sep. 19, 2023, issued in corresponding International Patent Application No. PCT/KR2022/019347, filed Dec. 1, 2022, 15 pages.

*Primary Examiner* — Chad H Smith
(74) *Attorney, Agent, or Firm* — Christensen O'Connor Johnson Kindness PLLC

(57) ABSTRACT

Disclosed are a low refractive index resin composition for TPP nano 3D printing and photonic wire bonding method using the same. The low refractive index resin composition for TPP nano 3D printing is made of a fluorinated resin composition with a low refractive index including a (meth) acrylic reactive group with sufficient solvency for a photoinitiator for TPP reaction. As a result, by supporting to print a micro-sized single-mode optical waveguide as well as cladding of an optical waveguide surrounding the single-mode optical waveguide thus formed through a TPP nano 3D printing method, a photonic wire bonding (PWB) method that can manufacture a photonic integrated circuit (PIC) with minimal optical loss and high reliability is proposed.

8 Claims, 1 Drawing Sheet

(51) Int. Cl.

| | |
|---|---|
| ***C08F 290/06*** | (2006.01) |
| ***G02B 6/138*** | (2006.01) |

(56) References Cited

FOREIGN PATENT DOCUMENTS

| | | | |
|---|---|---|---|
| WO | 2022/035994 | A1 | 2/2022 |
| WO | 2022/232303 | A1 | 11/2022 |

[FIG. 1]
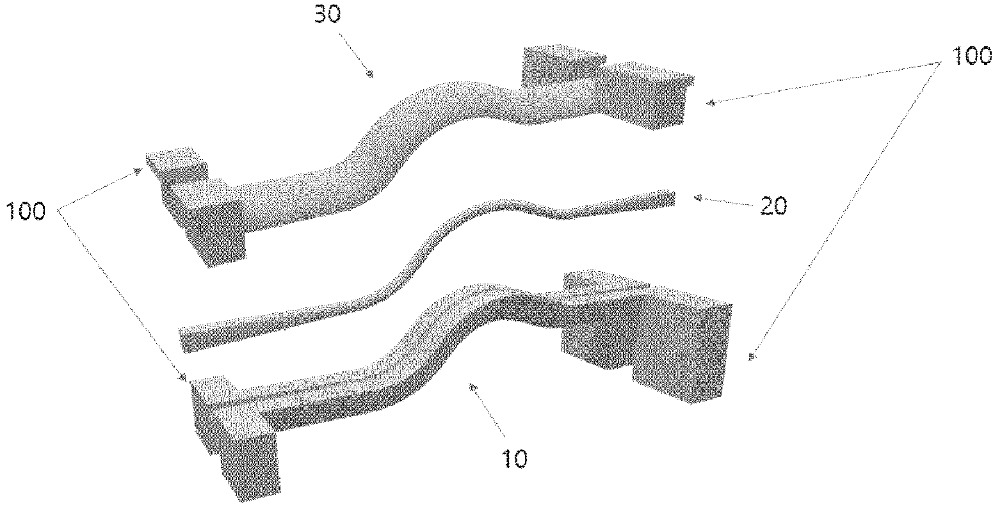
[FIG. 2]
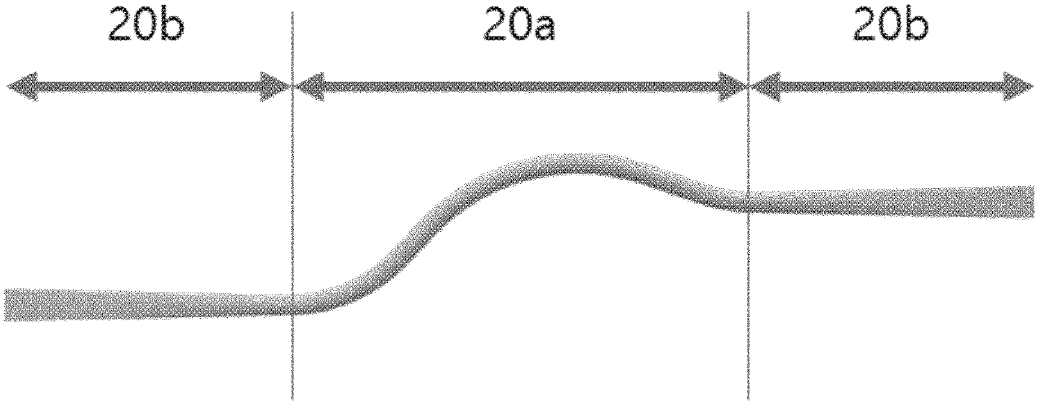

LOW REFRACTIVE INDEX RESIN COMPOSITION FOR TPP NANO 3D PRINTING AND PHOTONIC WIRE BONDING METHOD USING THE SAME

TECHNICAL FIELD

The present invention relates to a low refractive index resin composition for TPP nano 3D printing and a photonic wire bonding (PWB) method using the same, and more particularly, to a photonic wire bonding (PWB) method capable of minimizing optical loss and supporting manufacturing of a highly reliable photonic integrated circuit (PIC) by providing a fluorinated resin composition having a low refractive index including a (meth)acrylic reactor, which may be applied to a nano 3D printing method, using a two photon polymerization (TPP) reaction, and thus, directly forming cladding of an optical waveguide surrounding a micro-sized single-mode optical waveguide core on a circuit board through the TPP nano 3D printing method.

BACKGROUND ART

Two photon polymerization (TPP) is a photopolymerization reaction with nonlinear characteristics that are achieved by simultaneously absorbing two photons in a medium, if the quantity of incident light increases above a certain level, when light with energy lower than an energy gap between a ground state and an excited state of the medium is incident, and is a technology used for 3D printing of nanostructures using a laser direct writing (LDW) method that selectively cures a space where light is focused by focusing light emitted from a low-energy light source, such as an infrared light, into a pre-selected space at a specific location to increase the quantity of light (i.e., energy density).

The 3D printing of this laser direct writing (LDW) method is generally performed in a method of manufacturing a nanostructure of a desired shape by continuously changing a focal position of an objective lens using an optical system to focus light on a pre-set precise target position, and in particular, is a nano 3D printing technology that is mainly used for photonic wire bonding (PWB) forming an optical waveguide connecting optical elements mounted on a chip during manufacturing a photonic integrated circuit (PIC) based on silicon photonics in which various optical elements are integrated and manufactured on a single chip, as in the technology disclosed in U.S. Pat. No. 9,034,222, and the like.

Here, optical elements mounted on the PIC manufactured in the above-described method usually have a separation distance in the range of hundreds of μm, and the optical waveguide connecting the optical elements is designed to have a diameter of several μm or less to maintain a single mode. A wire structure (i.e., optical waveguide) formed in this way cannot avoid being relatively vulnerable to external shocks and/or changes in the surrounding environment such as temperature or humidity. For the passivation of such a wire structure, by covering and curing the optical waveguide and its surroundings with a low refractive index photocurable resin, the wire structure serves as the cladding of the optical waveguide and at the same time serves to protect the optical waveguide from the external shocks and the changes in the surrounding environment. Such the passivation of the optical waveguide is performed by applying a low refractive index resin having a viscosity of about several thousand cPs on a PIC chip on which the optical element and the optical waveguide are formed and curing the low refractive index resin.

However, in optical elements, such as an optical modulator, an optical detector, an optical multiplexer, and an optical coupler, constituting the above-described optical integrated circuit (PIC), since a thickness (height) of a device mounted on a circuit board is usually hundreds of μm or more, and a mounting location thereof is often separated by hundreds of μm or more from a bottom surface of the board, optical input/output units of these devices are usually formed at a distance of hundreds to thousands of μm or more from the bottom surface of the substrate, and accordingly, the optical waveguide connecting these optical input/output units should also be formed at a distance of hundreds to thousands of μm or more from the bottom surface of the substrate. Therefore, an empty space of hundreds to thousands of μm exists between an upper portion of the bottom surface of the substrate and the optical waveguide.

Therefore, as described above, the problem of damaging a connection state of the optical waveguide formed between optical elements due to a load of the applied resin as well as a frictional force and surface tension of a high-viscosity resin often occurs while applying a high-viscosity, low-refractive resin with a viscosity of several thousand cPs on the PIC chip, and as a volume of the applied low refractive index resin contracts while the applied low refractive index resin is cured, a change occurs in a connection position of an optical waveguide formed between optical elements. Such position change of photonic wire bonding (PWB) has become an important problem that should be necessarily solved, especially when connecting between single-mode optical elements requiring a limit tolerance of at least 0.5 μm.

DISCLOSURE

Technical Problem

An object of the present invention provides a new and improved photonic wire bonding (PWB) method and a low refractive index resin composition effectively used therefor to manufacture a photonic integrated circuit (PIC) having more improved light efficiency and high reliability by minimizing the occurrence of defects during a manufacturing process such as damage to an optical waveguide and/or a change in a bonding position caused by a low refractive resin applied on a circuit board for passivation of the optical waveguide in a wire bonding (PWB) process for forming the conventional PIC described above.

Technical Solution

To achieve the above object, according to the present invention, there are provided a low refractive index resin composition for two photon polymerization (TPP) nano 3D printing contains 30 to 70 wt % of perfluoro ether oligomer, 8 to 30 wt % of fluorinated monomer; 10 to 40 wt % of fluorinated (meth)acrylate oligomer, and 0.5 to 2.0 wt % of photoinitiator for TPP reaction, and thus, can be effectively used in a nano 3D printing method using the TPP reaction, and at the same time, an improved and effective photonic wire bonding (PWB) method using the same to manufacture a photonic integrated circuit (PIC) with improved light efficiency and high reliability.

Advantageous Effects

A low refractive index resin composition for cladding of an optical waveguide prepared according to the present invention provides sufficient solvency for a photoinitiator for TPP reaction, thereby supporting precise formation of the cladding of the optical waveguide connecting between optical elements through a TPP-based photonic wire bonding using a 3D nano-printer during manufacturing an optical integrated circuit (PIC).

In addition, according to a photonic wire bonding (PWB) method proposed in the present invention, by supporting to form both an optical waveguide core connecting between optical elements provided on a substrate and cladding of an optical waveguide surrounding the core using a 3D nano-printer by a TPP-based photonic wire bonding (PWB) method through light irradiation, it is possible to dramatically improve precision and reliability of a manufactured optical integrated circuit (PIC).

BRIEF DESCRIPTION OF THE DRAWINGS

FIG. 1 is a diagram schematically illustrating a core and cladding of an optical waveguide constituting photonic wire bonding (PWB) formed according to the present invention.

FIG. 2 is a diagram for describing a shape of an optical waveguide core illustrated in FIG. 1.

| | |
|---|---|
| 10: | Lower cladding |
| 20: | Optical waveguide core |
| 20a: | Core part |
| 20b: | Taper part |
| 30: | Upper cladding |
| 100: | Fixed hook |

BEST MODE

Hereinafter, a photonic wire bonding method made through a TPP nano 3D printing process according to the present invention and a low refractive index resin composition used to form cladding of an optical waveguide in the process will be described in more detail through several examples.

As briefly described above, in manufacturing an optical integrated circuit (PIC) using photonic wire bonding (PWB) in the related art, by first dropping a resin composition for a high refractive optical waveguide core to form an optical waveguide between optical elements mounted on a board, printing the optical waveguide core connecting between the optical elements through light irradiation according to a pre-designed pattern using a 3D nanoprinter, and then dropping and curing the low refractive index resin composition for the cladding of the optical waveguide in an amount that can cover the entire printed optical waveguide, including a connection portion of the optical elements, an optical integrated circuit (PIC) was formed.

However, in the manufacturing process of such a conventional optical integrated circuit (PIC), as described above, defects such as damage to the optical waveguide core printed on the substrate and/or change in bonding position frequently occur due to the load and surface tension of the applied low refractive index resin composition and/or the contraction force during the curing process during the dropping and curing of the low refractive index resin composition for cladding.

The present invention is to fundamentally solve the problems of the prior art. The present invention provides an improved photonic wire bonding (PWB) method capable of minimizing the occurrence of defects in the manufacturing process and at the same time manufacturing a photonic integrated circuit (PIC) with improved light efficiency and high reliability by applying a low refractive index resin composition capable of two photon polymerization (TPP) between optical elements mounted on a circuit board, first printing a lower cladding, which serves to fix a connection portion between the optical elements and an optical waveguide, using a TPP-based nano 3D printing technique while guiding the optical waveguide connecting between the optical elements guides an area to be printed through selective light irradiation, applying the high refractive index resin composition for forming an optical waveguide core on the printed lower cladding again and printing a high refractive optical waveguide core on the optical waveguide printing area formed on the lower cladding through a TPP-based nano 3D printing technique to form photonic wire bonding (PWB) connecting between the optical elements, and then, finally printing an upper cladding on an upper portion thereof again using the TPP-based nano 3D printing technique in the same way as before.

MODE FOR INVENTION

In order to implement a photonic wire bonding (PWB) method according to the present invention as described above, first of all, a resin composition that enables the two photon polymerization (TPP) reaction described above, has a low refractive index suitable for cladding of an optical waveguide in a single mode, and has excellent adhesion to optical elements is essential.

In other words, the low refractive index resin composition applied to the implementation of the present invention needs to 1) provide sufficient solubility for a photopolymerization initiator for the two photon polymerization (TPP) reaction,
2) have a low refractive index of at least 1.400 or less after being cured, and
3) show excellent adhesion to silicon, quartz, metal, etc.

Looking at this in more detail, in order to implement TPP-based 3D nanoprinting, sufficient solubility should be guaranteed so that the two photon polymerization initiator for the TPP reaction may be sufficiently dissolved and mixed in the resin composition. However, in order to effectively suppress optical loss due to a generation of an optical signal in a higher order mode while a photonic wire (i.e., an optical waveguide core) having a refractive index of at least 1.5 or more and a diameter of 2 m transmits and receives an optical signal of a terabyte or more in a single mode, a refractive index of cladding should be at least 1.400 or less, and preferably 1.375 or less.

Therefore, in order to realize such cladding having the low refractive index, a resin composition containing 40 wt % or more of fluorine is usually used as a resin composition applied for optical fiber cladding. In this case, resins such as perfluoro ether, fluorinated siloxane, and fluorinated acryl containing a high content of fluorine are not mixed well with common hydrocarbon compounds due to their low surface tension and high density, so a problem arises in that the two photon polymerization initiator for the TPP reaction is not sufficiently dissolved in the above-described resin composition for cladding.

In particular, in order to implement the 3D nanoprinting based on the TPP reaction, at least 1.0 wt % or more of the photoinitiator for TPP should be contained in the total weight of the resin composition, but since most photoinitiators for TPP commonly used have a hydrocarbon structure with a high molecular weight containing a large number of benzene rings, as described above, it is difficult to implement the TPP because it is hardly dissolved and mixed in a low refractive index photocurable resin composition containing a large amount of fluorine.

In the present invention, in order to solve this problem, since the low refractive index fluorinated oligomer described above has both a hydrocarbon structured (meth)acrylic group and a fluorinated carbon group, the photoinitiator for TPP composed of a hydrocarbon group having a high molecular weight and a fluorinated monomer that serves as a co-solvent for low refractive index photocurable resins having a high fluorine content are mixed to synthesize resin compositions, thereby improving the solubility of the photoinitiator.

Furthermore, by synthesizing resin compositions containing a fluorinated (meth)acrylic having a methoxy (ethoxy) silane reactive group in order to improve physical properties of the resin composition for cladding made of the above-described low refractive index fluorinated oligomer and fluorinated monomer and improve bonding strength with optical elements by increasing adhesion to silicon, quartz, metal, etc., a resin composition for optical fiber cladding capable of improving durability of an optical integrated circuit (PIC) formed on a circuit board while supporting photonic wire bonding (PWB) formed on the circuit board to be more firmly connected to the optical element has been developed.

Hereinafter, specific composition components of the low refractive index resin composition for TPP nano 3D printing according to the present invention developed through the above-described process will be described.

The low refractive index resin composition for TPP nano 3D printing according to the present invention is configured to contain, i) 30 to 70 wt % of perfluoro ether oligomer for low refractive properties, ii) 8 to 30 wt % of fluorinated monomer to improve solvency for photoinitiator for TPP reaction, iii) 10 to 40 wt % of a fluorinated acrylate oligomer for improving physical properties of a resin composition and increasing adhesion to an optical element, and iv) 0.5 to 2.0 wt % of photoinitiator for TPP reaction.

i) Perfluoro Ether Oligomer for Low Refractive Index

The perfluoro ether oligomer used in the synthesis of the low refractive index resin composition for TPP nano 3D printing according to the present invention is a polysiloxane oligomer previously developed by the applicant of the present invention, and its specific structural formula is as shown in [Formula 1] below (Refer to Korean Patent Laid-Open Publication No. 10-2016-0137929, "Polysiloxane oligomers, polysiloxane copolymers and the preparation method thereof").

[Formula 1]

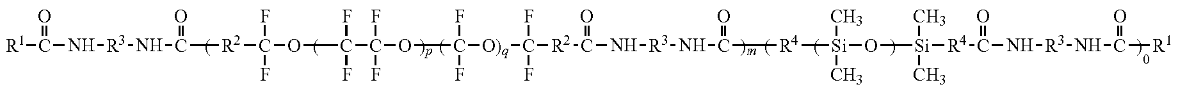

Where, $R^1$ is each independently a (meth)acrylate group having a hydrocarbon ($CH_2$) number of 2 to 10, $R^2$ is each independently —$CH_2O$— or —$CH_2(OCH_2CH_2)_aO$— (a is an integer from 1 to 3), $R^3$ is an aromatic or aliphatic hydrocarbon group having 6 to 20 carbon atoms, $R^4$ is each independently —$CH_2$—, —$CH_2CH_2$— or —$CH_2(OCH_2CH_2)_a$— (a is an integer from 1 to 10), m, o, p, q, and r are repeating numbers for each repeating unit, m and o are 1 to 6, r is 1 to 5,000, p is 1 to 20, and a ratio p/q of p to q ranges from 0.8 to 2.5.

As a result of experiments using DHBO32, DMO, D9MOPEG200, and DHGO34 products of Rubentics ADM, which are commercial resin compositions having a structure of [Formula 1] above, it was confirmed that all of these resin compositions show a low refractive index of 1.375 or less after being cured and have low refractive properties suitable for cladding of waveguides.

However, as a result of compatibility experiments with various types of photoinitiators for TPP reactions, it was found that the above-described perfluoro ether oligomer alone could not show sufficient solvency for the photoinitiator for TPP reaction. Accordingly, it was confirmed that an additional composition was needed to improve the solvency of the photoinitiator for TPP reaction.

Here, the above-described perfluoro ether oligomer is a composition contained in the resin composition to implement low refractive properties required for the cladding of the optical waveguide, and the composition of the present invention is not necessarily limited thereto, and it goes without saying that various fluorinated oligomers such as fluorinated siloxane having a structure of [Formula 2] disclosed in Korean Patent Laid-Open Publication No. 10-2016-0137929 may be applied.

[Formula 2]

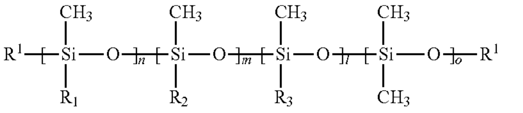

Where, $R_1$ is each independently a (meth)acrylate group having a hydrocarbon ($CH_2$) number of 2 to 10, $R_2$ is a hydrogenated carbon group or a fluorinated carbon group having 2 to 20 carbon atoms, $R_3$ is an alkoxysilane group having 1 to 5 silicon atoms l, m, n, and o are repeating numbers for each repeating unit, all ranging from 1 to 5,000.

ii) Fluorinated Monomer to Improve Solvency for Photoinitiator for TPP Reaction As described above in i), as it was confirmed that the sufficient solvency for the photoinitiator for the TPP reaction may not be secured with only the perfluoro ether oligomer for imparting low refractive properties to the resin composition, in the present invention, for a role of a co-solvent capable of dissolving both a photoinitiator for TPP made of a high molecular weight hydrocarbon group and a perfluoro ether oligomer having a high fluorine content, the solubility of the photoinitiator was improved by synthesizing a resin composition by mixing a fluorinated monomer having both a hydrocarbon-structured (meth) acrylic group and a fluorinated carbon group.

Examples of such fluorinated monomers (numbers in parentheses in % are a fluorine content of monomer (wt %)) contains 2,2,2-trifluoroethyl acrylate (37%), 2,2,2-trifluoroethyl methacrylate (34%), 2,2,3,3-2,2,3,3,3-pentafluoropropyl methacrylate (41%), 2,2,3,3-tetrafluoropropyl methacrylate (38%), 2,2,3,3,3-pentafluoropropyl methacrylate (44%), 1H,1H,5H-octafluoropentyl acrylate (53%), 1H,1H,5H-octafluoropentyl methacrylate (51%), 1,1,1,3,3,3-hexafluoroisopropyl acrylate (51%), 2,2,3,4,4,4-hexafluorobutyl methacrylate (46%), 1,1,1,3,3,3-hexafluoroisopropyl methacrylate, 2,2,3,3,4,4,4-heptafluorobutyl methacrylate (48%), 1H,1H,2H,2H-nonafluorohexyl acrylate (50%), 1H,1H,2H,2H-nonafluorohexyl methacrylate (54%), 2,2,3,3,4,4,5,5,6,6,7,7-dodecafluoroheptyl acrylate (52%), 2,2,3,3,4,4,5,5,6,6,7,7-dodecafluoroheptyl methacrylate (59%), 1H,1H,2H,2H-tridecafluoro-n-octyl acrylate (57%), H,1H,2H,2H-tridecafluoro-n-octyl methacrylate (59%), 1,6-bis(acryloyloxy)-2,2,3,3,4,4,5,5-octafluorohexane (57%), 1,6-bis(acryloyloxy)-2,2,3,3,4,4,5,5-octafluorohexane (41%), 2-perfluorooctyl ethyl acrylate (62%), 2-perfluorodecyl ethyl acrylate (65%), 2-perfluorooctyl ethyl methacrylate (61%), and the like.

Here, the higher the fluorine content of the fluorinated monomer, the more advantageous it is to lower the refractive index of the resin composition, but the lower the solvency of the photoinitiator for TPP.

The following <Test Example 1> is a test for searching for a fluorinated monomer capable of providing sufficient solvency for the photoinitiator for TPP in the resin composition according to the present invention, and after mixing various fluorinated monomers exemplified above with DMO and DHGO34 resin of Rubentics ADM selected from the perfluoro ether oligomer materials described above in a weight ratio of 10% to 30%, the solvency of the photoinitiator for TPP was tested.

As the photoinitiator used in the test, a bis-triazole-based initiator (initiator #1) having a structure of [Formula 3] below and a benzylamine-based initiator having a structure of [Formula 4] (initiator #2) were used.

[Formula 3]

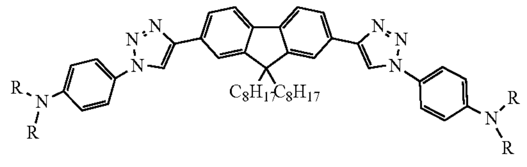

Me-Bis (R = Me) 96%
Ph-Bis (R = Ph) 99%

[Formula 4]

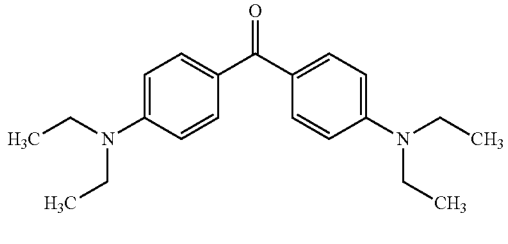

TABLE 1

| | Perfluoro ether oligomer | | | | | | | |
|---|---|---|---|---|---|---|---|---|
| | DMO | | | | DGHO34 | | | |
| | Monomer content 10% | | Monomer content 30% | | Monomer content 10% | | Monomer content 30% | |
| Fluorinated Monomer (fluorine content, wt %) | Initiator #1 | Initiator #2 | Initiator #1 | Initiator #2 | Initiator #1 | Initiator #2 | Initiator #1 | Initiator #2 |
| 2,2,2-Trifluoroethyl Acrylate (37%) | ○ | ○ | ○ | ○ | ○ | ○ | ○ | ○ |
| 1H,1H,5H-Octafluoropentyl Acrylate (53%) | ○ | ○ | ○ | ○ | ○ | ○ | ○ | ○ |
| 2-Perfluorooctyl ethyl acrylate (62%) | X | X | X | X | X | X | X | ○ |
| 2-Perfluorodecyl ethyl acrylate (65%) | X | X | X | X | X | X | X | ○ |

<Test Example 1> Comparison of Photoinitiator Solvency According to Type of Fluorinated Monomer, Compositional Content of Resin Composition, and Fluorine Content (Wt %) Contained in Monomer (○: Clear, X: Haze)

As confirmed in the above <Test Example 1>, in the case of a monomer having a fluorine content of 60 wt % or more of fluorinated monomer, the solvency for the photoinitiator is rapidly reduced, and the photoinitiator shows a haze precipitation state in the resin composition, so it was confirmed that it is not suitable for use as a co-solvent. As a result, in the present invention, only fluorinated monomers having 30 to 60 wt % of fluorine content were selectively applied in configuring the low refractive index resin composition for TPP nano 3D printing.

In addition, through various similar tests, it was confirmed that the sufficient solvency for the photoinitiator for TPP may be provided to the resin composition when the fluorinated monomer contained in the resin composition ranges from 8 to 30 wt %.

In addition, in the above test example, the bis-triazole-based initiator (initiator #1) and the benzylamine-based initiator (initiator #2) were used, but the initiator applied to the present invention is necessarily limited thereto. In addition, it goes without saying that various photoinitiators including an aminostyryl-triazines-based initiator, an imidazole-based initiator, a benzyl morpholino phenyl-based initiator, a bengal-based initiator, an erythrosine-based initiator, an erythrosine-based initiator, an isopropylthioxan-based initiator, a thienyl coumarin-based initiator, a diphenyl phosphine-based initiator, and the like may be used.

iii) Fluorinated Acrylate Oligomer for Improving Physical Properties of Resin Composition and Increasing Adhesion to an Optical Element In addition, in the present invention, as described above, to improve various physical properties of the resin composition of the present invention, which serves as the cladding of the optical waveguide through photonic wire bonding (PWB) and to improve the bonding strength with the optical elements by increasing adhesion to silicon, quartz, metal, etc., fluorinated (meth)acryl having a methoxy (ethoxy) silane reactive group is contained in the prepared resin composition. In this case, the fluorinated (meth)acryl used in the synthesis of the low refractive index resin composition for TPP nano 3D printing according to the present invention is also a fluorinated acrylate oligomer previously developed by the applicant of the present invention, and its specific structural formula is as shown in [Formula 5] below (refer to Korean Patent Publication No. 10-2353598, "Poly(meta) acrylate copolymers and the resin compositions for optical fiber cladding based on the copolymers").

[Formula 5]

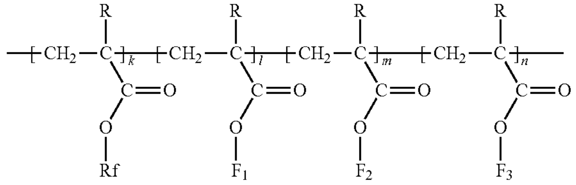

Where, k, l, m, and n are constants, each having a value between 0 and 10,000,

R is —H, —$CH_3$, or a hydrocarbon group having 20 or less carbon atoms, $R_f$ is a fluorocarbon group having 2 to 40 carbon atoms including fluorocarbons (—$CF_2$—, —$CF_3$), $F_1$ is a hydrocarbon group having 2 to 40 carbon atoms and containing at least one (meth)acrylate, vinyl or epoxy reactive group, $F_2$ is a silane containing 1 to 3 methoxy reactive groups (—$OCH_3$) or ethoxy reactive groups (—$OCH_2CH_3$), and $F_3$ is a hydrocarbon group that does not react with a urethane bonding reaction and has 2 to 40 carbon atoms, and is a hydrocarbon group in which a part of the bonded hydrogen (H) is substituted with oxygen (O) or nitrogen (N).

The above-described fluorinated acrylate oligomer may be contained in the resin composition in an appropriate ratio according to various physical properties required for the low refractive index resin composition for TPP nano 3D printing to be prepared, and the resin composition according to the present invention contains 10 to 40 wt % of fluorinated acrylate oligomers.

Here, looking at the characteristics of each reactive group constituting the fluorinated acrylate oligomer in more detail, ① $F_1$: (Meth)Acrylate Reactive Group for Improving Physical Properties of Resin Composition In order for the cladding of the optical waveguide formed through the TPP 3D nanoprinting to meet the various environmental conditions required for optical element parts, it should also be able to exhibit physically sufficient stiffness and a high glass transition temperature as well as a low refractive index to maintain a single mode and minimize light loss. In the case of the perfluoro ether applied to the present invention, it is advantageous in implementing the low refractive index, but since the glass transition temperature of the oligomer is usually only −40° C. or lower due to the ether structure, as the perfluoroether composition ratio in the resin composition increases, the refractive index decreases, but the secant modulus and tensile strength decrease relatively. As a result, according to the present invention this is compensated by a fluorinated acrylate oligomer containing a (meth)acrylate reactive group F1.

② $F_2$: Methoxy (Ethoxy) Silane Reactive Group for Increasing Adhesion to Optical Element Structure Materials Such as Glass, Si, and SiN The optical element parts are mainly made of $SiO_2$, glass, Si, SiN, etc., and the cladding of the optical waveguide formed through the TPP 3D nanoprinting should have excellent adhesion to these materials. In this case, in the case of the low-refractive oligomer containing a large amount of fluorine, the adhesion to other materials tends to be significantly lowered due to relatively low surface tension and high specific gravity, so, in the present invention, this is compensated by a fluorinated acrylate oligomer containing a methoxy (ethoxy) silane reactive group F2.

③ $F_3$: In a Hydrocarbon Group Having 2 to 40 Carbon Atoms, a Hydrocarbon Group in which a Part of Hydrogen (H) Bonded to Carbon is Substituted with Oxygen (O) or Nitrogen (N)

It is a composition added to the resin composition to increase the glass transition temperature of the cladding of the optical waveguide formed through the TPP 3D nanoprinting in addition to improving the solvency of the photoinitiator for TPP, for example, in the case of a methyl group ($—CH_3$), the glass transition temperature is only 8° C., but in the case of a carboxyl group (—COOH), the glass transition temperature rises to 130° C., so it is possible to increase the glass transition temperature of the fluorinated acrylate oligomer.

Through various tests for the implementation of the above-described additional characteristics, in the present invention, a molar ratio of k, l, m, and n constituting the fluorinated acrylate oligomer in [Formula 5] above is adjusted in a range of 60 to 80% for k, 2 to 20% for l, 2 to 10% for m, and 2 to 20% for n, respectively, which was confirmed that this is more effective in improving the above-described additional properties.

Examples: Preparation of Fluorinated Acrylate Oligomer

In the following embodiment, prior to manufacturing the low refractive index resin composition for TPP nano 3D printing according to the present invention, as described in iii) above, the fluorinated acrylate oligomer included to improve physical properties of the resin composition synthesized for the cladding of the optical waveguide and increase the adhesion to the optical elements was prepared while partially changing its detailed composition ratio.

Example 1 (FAO #1)

While maintaining the temperature of 90° C. under a nitrogen purge, 200 g of MIBK as a solvent was added to a three-necked flask, and then, 341.4 g (79.0 mole %) of 2-perfluorohexyl ethyl methacrylate monomer, 7.8 g (6.0 mole %) of 2-hydroxyethyl methacrylate (HEMA), 9.9 g (4.0 mole %) of 3-(trimethoxysilyl)propyl methacrylate, and 9.6 g (11.0 mole %) of methacrylic acid and 2,2'-azobisisobutyronitrile (AIBN) as a thermal initiator were added at 1% with respect to the total acrylate monomer, and the monomer mixture was added dropwise using a dropping funnel for 1 hour. After the reaction proceeds for 10 hours, after 1,500 ppm of MEHQ stabilizer was added, 9.31 g of 2-methacryloyloxyethyl isocyanate in the same molar ratio as HEMA was added, 3 drops of DBTDL were added, and then the urethane reaction proceeded until all NCO reactive groups disappeared. After the urethane reaction ends, the temperature was maintained at 85° C. and all the solvents (MIBK) were distilled off under a vacuum atmosphere to prepare the fluorinated methacrylate oligomer containing 6.0 mole % of methacrylic reactive group, 4.0 mole % of trimethoxy silane, and 11.0 mole % of carboxylic acid group.

It was confirmed that the prepared fluorinated methacrylate oligomer was solid at room temperature and had a refractive index of 1.375.

Example 2 (FAO #2)

While maintaining the temperature of 90° C. under a nitrogen purge, 200 g of MIBK as a solvent was added to a three-necked flask, and then, 315.5 g (73.0 mole %) of 2-perfluorohexyl ethyl methacrylate monomer, 15.6 g (12.0 mole %) of 2-hydroxyethyl methacrylate (HEMA), 9.9 g (4.0 mole %) of 3-(trimethoxysilyl)propyl methacrylate, and 9.6 g (11.0 mole %) of methacrylic acid and 2,2'-azobisisobutyronitrile (AIBN) as a thermal initiator were added at 1% with respect to the total acrylate monomer, and the monomer mixture was added dropwise using a dropping funnel for 1 hour. After the reaction proceeds for 10 hours, after 1,500 ppm of MEHQ stabilizer was added, 18.3 g of 2-methacryloyloxyethyl isocyanate in the same molar ratio as HEMA was added, 3 drops of DBTDL were added, and then the urethane reaction proceeded until all NCO reactive groups disappeared. After the urethane reaction ends, the temperature was maintained at 85° C. and all the solvents (MIBK) were distilled off under a vacuum atmosphere to prepare the fluorinated methacrylate oligomer containing 12.0 mole % of methacrylic reactive group, 4.0 mole % of trimethoxy silane, and 11.0 mole % of carboxylic acid group.

It was confirmed that the prepared fluorinated methacrylate oligomer was solid at room temperature and had a refractive index of 1.380.

Example 3 (FAO #3)

While maintaining the temperature of 90° C. under a nitrogen purge, 200 g of MIBK as a solvent was added to a three-necked flask, and then, 332.8 g (77.0 mole %) of 2-perfluorohexyl ethyl methacrylate monomer, 15.6 g (12.0 mole %) of 2-hydroxyethyl methacrylate (HEMA), and 9.6 g (11.0 mole %) of methacrylic acid and 2,2'-azobisisobutyronitrile (AIBN) as a thermal initiator were added at 1% with respect to the total acrylate monomer, and the monomer mixture was added dropwise using a dropping funnel for 1 hour. After the reaction proceeds for 10 hours, after 1,500 ppm of MEHQ stabilizer was added, 18.3 g of 2-methacryloyloxyethyl isocyanate in the same molar ratio as HEMA was added, 3 drops of DBTDL were added, and then the urethane reaction proceeded until all NCO reactive groups disappeared. After the urethane reaction ends, the temperature was maintained at 85° C. and all the solvents (MIBK) were distilled off under a vacuum atmosphere to prepare the fluorinated methacrylate oligomer containing 12.0 mole % of methacrylic reactive group, 0.0 mole % of trimethoxy silane, and 11.0 mole % of carboxylic acid group.

It was confirmed that the prepared fluorinated methacrylate oligomer was a solid phase at room temperature and had a refractive index of 1.376.

After 8 wt % of 2-perfluorohexyl ethyl methacrylate monomer and CP-4 photocuring initiator were mixed with the fluorinated methacrylate oligomers (FAO #1, FAO #2, and FAO #3) prepared through the above-described examples, respectively, to obtain a film having a thickness of 1 mm and then cure the film using a UV curing machine, a secant modulus was measured using a universal testing machine (UTM), and the measured results were as shown in <Table 2> below.

TABLE 2

| Fluorinated methacrylate oligomer | l (Methacrylate) | m (Trimethoxy-silane) | n (Carboxylic acid) | Viscosity (25 degrees) | Refractive index | Secant modulus |
|---|---|---|---|---|---|---|
| FAO #1 | 6.0% | 6.0% | 11.0% | Solid phase | 1.375 | 185 MPa |
| FAO #2 | 12.0% | 12.0% | 11.0% | Solid phase | 1.380 | 240 MPa |
| FAO #3 | 12.0% | 0.0% | 11.0% | Solid phase | 1.376 | 245 MPa |

<Table 2> Physical Properties of Fluorinated Methacrylate Oligomer Prepared Through Examples As illustrated in Table 2 above, it was confirmed that the fluorinated methacrylate oligomers prepared in Examples may effectively improve the secant modulus of the resin composition.

Manufacturing of Low Refractive Index Resin Composition for TPP Nano 3D Printing Finally, by using each of the fluorinated methacrylate oligomers (FAO #1, FAO #2, and FAO #3) prepared through the above-described example, a resin composition (Preparation Examples 1 to 3) in which 20 wt % of fluorinated methacrylate oligomers (FAO #1, FAO #2 or FAO #3), 50 wt % of DMO as a perfluoro ether oligomer, 29 wt % of 2-perfluorohexyl ethyl methacrylate which is a fluorinated monomer for a co-solvent, and 1 wt % of a benzylamine-based photoinitiator (initiator #2) which is a photoinitiator for TPP reaction were mixed. After the prepared resin composition was formed into a film having a thickness of 1 mm and cured through a UV curing machine, physical properties of the prepared example including a secant modulus, a refractive index, and a glass adhesion were measured using the universal testing machine (UTM).

Results of comparing physical properties of commercially available perfluoro ether oligomer (DMO) with those of Preparation Examples prepared by mixing the fluorinated methacrylate oligomer and the fluorinated monomer according to the present invention are shown as in Table 3.

TABLE 3

| | Fluorinated methacrylate oligomer | Initiator compatibility | Viscosity (25 degrees) | Refractive index | Glass adhesion | Secant modulus |
|---|---|---|---|---|---|---|
| DMO | — | Haze | — | 1.351 | 6 gf/cm | 30 MPa |
| Preparation Example 1 | FAO #1 | Clear | 5,650 cPs | 1.365 | 59 gf/cm | 90 MPa |
| Preparation Example 2 | FAO #2 | Clear | 8,950 cPs | 1.370 | 62 gf/cm | 125 MPa |
| Preparation Example 3 | FAO #3 | Clear | 6,230 cPs | 1.367 | 7 gf/cm | 124 MPa |

<Table 3> Comparison of Physical Properties of Low Refractive Index Resin Composition for TPP Nano 3D Printing As shown in <Table 3>, it can be seen that all of the low refractive index resin compositions for TPP nano 3D printing (Preparation Examples 1 to 3) prepared according to the present invention show excellent solvency for the photoinitiator for TPP reaction, and have a high secant modulus of 300% to 400% or more compared to DMO made of only the perfluoro ether oligomer.

In addition, Preparation Example 1 and Preparation Example 2 in which fluorinated methacrylate oligomers (FAO #1, FAO #2) each containing 6% and 12% of methoxy (ethoxy) silane reactive groups to increase adhesion to optical element structure materials such as Glass, Si, and SiN are mixed show that the adhesion to glass is improved nearly 10 times compared to Preparation Example 3 or DMO, which does not contain any silane reactive group. As described above, in constituting the fluorinated acrylate oligomer, it can be confirmed that including the silane reactive group in an appropriate range is an important condition for improving the adhesion to an optical element.

3D Nanoprinting Test

In order to test the suitability of the low refractive index resin composition prepared according to the present invention for the TPP nano 3D printing, the TPP nano 3D printing was performed using a lens of ×63 magnification and a laser of 30 mW power through GT of Nanoscribe Co., Ltd. After printing a cube having each corner of 4 μm, the size of the printed 3D structure was measured through SEM photographs, and the measured results are as shown in <Table 4> below.

TABLE 4

| Resin composition | Cube corner length (design) | SEM measurement result (x-axis direction) | SEM measurement result (y-axis direction) | SEM measurement result (z-axis direction) |
|---|---|---|---|---|
| Preparation Example 1 | 4.0 um | 4.0 um | 4.0 um | 3.9 um |
| Preparation Example 2 | 4.0 um | 4.1 um | 4.0 um | 3.8 um |
| Preparation Example 3 | 4.0 um | 4.1 um | 4.0 um | 3.9 um |

<Table 4> TPP Nano 3D Printing Test Results

As shown in <Table 4>, it can be seen that the printed 3D structure shows a manufacturing error of 0.1 to 0.2 μm or less in each direction, and therefore, has sufficient performance to form the photonic wire bonding (PWB) through the TPP nano 3D printing.

The present invention also proposes a photonic wire bonding (PWB) method capable of manufacturing a highly reliable optical integrated circuit (PIC) with minimized optical loss by using the TPP nano resin composition for 3D printing composed of such a composition to directly print the cladding of the optical waveguide surrounding the single-mode optical waveguide provided in the photonic integrated circuit (PIC) on the substrate through the 3D nanoprinting.

As already briefly explained above, the conventional photonic wire bonding (PWB) method used to connect between the optical elements drops the resin for the high refractive waveguide core between the optical elements to print the optical waveguide that optically connects between the optical elements in the single mode through the 3D nanoprinter, drops the low-refractive cladding resin again to cover the entire printed photonic wire (PW, i.e., optical waveguide) and a part of the optical elements connected to each other, followed by UV curing. As a result, when dropping the cladding resin or during the curing of the dropped cladding resin, defects such as damage to the optical waveguide or change in connection position due to the load, surface tension, and/or contraction force frequently occurred.

This is a problem caused by manufacturing the PIC by the method of forming only a core part of an optical waveguide with a photonic wire (PW) through a TPP reaction using a resin for a high refractive waveguide core and then simply dropping and curing a low refractive cladding resin therearound since the conventional resin for low-refractive index cladding such as the perfluoro ether oligomer exemplified above lack solvency for TPP photoinitiators and thus is difficult to implement the TPP reaction. As described in detail above, the present invention has proposed the resin composition for cladding of an optical waveguide with improved solubility of a photoinitiator for TPP by mixing a fluorinated monomer with the conventional low refractive index fluorinated oligomer for cladding. Hereinafter, an effective photonic wire bonding (PWB) method that can be usefully applied to manufacturing a PIC, which is performed using the resin composition for the cladding of the optical waveguide of the present invention described above will be described in more detail with reference to the accompanying drawings.

FIG. 1 is a diagram schematically illustrating a core 20 and claddings 10 and 30 of an optical waveguide formed by connecting between optical elements constituting a photonic integrated circuit (PIC) by a photonic wire bonding (PWB) method according to the present invention. In forming the photonic wire bonding (PWB) between the optical elements according to the present invention, first, by applying the low refractive index resin composition for TPP reaction according to the present invention between the optical elements mounted on the circuit board, and then cured through selective light irradiation using a 3D nanoprinter, the lower cladding 10 serving to fix the connection portion with the optical elements is printed while the optical waveguide core 20 connected between the optical elements guides an area to be printed.

In this case, as illustrated in FIG. 1, fixed hooks 100 for increasing an attachment area with the optical elements connected to each other are formed on both ends of the lower cladding 10 printed on the board to support the connection state of the optical elements and the PWB connecting the optical elements to be maintained more firmly.

When the printing of the lower cladding 10 is completed, the applied low refractive index resin composition is washed and removed, the high refractive index resin for the optical waveguide core is applied, and then cured through the selective light irradiation using the 3D nanoprinter, so that the optical waveguide core 20 is printed on the optical waveguide core printing area formed on the lower cladding 10.

In this case, as illustrated in FIG. 2, the optical waveguide core 20 printed in this way includes a central core part 20*a* and taper parts 20*b* provided on both sides of the core part 20*a*. Here, the core part 20*a* may be formed in a circular or other cross-sectional shape, and preferably has a thickness in the range of 1 μm to 5 μm to maintain a single mode.

In addition, the taper part 20*b* is a section for forming a connection structure with the core part 20*a* to match the size and shape of the optical element connection part according to the structure of the optical element to be connected, and may have various structures depending on the length of the optical waveguide to be printed, the refractive index of the core, the refractive index of the cladding, the wavelength of the transmitted optical signal, and the like.

When the printing of the optical waveguide core 20 is completed, the similarly applied high refractive index resin for the core is washed and removed, the low refractive index resin composition for TPP reaction according to the present invention is applied again and then cured through the selective light irradiation using the 3D nanoprinter, and the upper cladding 30 is printed on the upper portion of the lower cladding 10 and the optical waveguide core 20, followed by being washed and dried, so the formation of the photonic wire bonding (PWB, i.e., optical waveguide) connecting between the optical elements is completed.

In this case, as illustrated in FIG. 1, it goes without saying that the fixed hooks 100 for increasing the attachment area with the optical elements connected to each other are formed on both ends the upper cladding 30 printed on the upper portion of the lower cladding 10 and the optical waveguide core 20.

In addition, while printing the upper cladding 30 through the selective light irradiation using the 3D nanoprinter, the light irradiation area is extended to the lower portion of the upper surface of the lower cladding 10 by a certain depth to photo-cure the upper cladding 30, so it is possible to effectively prevent a gap from being generated between the upper cladding 30 and the lower cladding 10 due to an alignment error in the printing position that may occur during the printing process.

In this case, the above-described expansion range of the irradiation area may vary depending on the alignment error range of the 3D nanoprinter used, but usually several μm (1 to 2 μm).

In addition, the cladding of the optical waveguide formed by bonding the upper cladding 30 and the lower cladding 10 may be formed in various forms depending on the shape or structure of the optical waveguide core and optical elements, and it is preferable that the total thickness of the cladding to be formed is at least 20 μm or more to provide the structural stability of the optical integrated circuit (PIC).

After the printing of the optical waveguide core and the cladding surrounding the optical waveguide core is completed through the above-described process, a post-curing process is performed through additional light irradiation to the photonic wire bonding (PWB) formed on the board to completely cure the PWB, thereby finishing the manufacturing of the optical integrated circuit (PIC).

Although the present invention has been described through several representative examples above, the embodiments of the present invention described as examples only show some examples of preferred embodiments of the present invention, but the present invention is not limited thereto, and the scope of the present invention is limited by the matters described in the claims below. In addition, it is natural for those skilled in the art to implement various modifications without changing the subject matter of the present invention claimed in the claims, and therefore, such modifications or improvements will fall within the scope of the present invention as long as they are within the scope of matters obvious to those skilled in the art to which the present invention belongs.

INDUSTRIAL APPLICABILITY

As described above, according to a low refractive resin composition for cladding of an optical waveguide manufactured according to the present invention and a photonic wire bonding (PWB) method using the same, by supporting to print both an optical waveguide core connecting between optical elements mounted on a circuit board and the cladding of the optical waveguide surrounding the core using a 3D nanoprinter by a TPP-based photonic wire bonding (PWB) method through light irradiation, it is possible to dramatically improve precision and reliability of a manufactured optical integrated circuit (PIC).

The invention claimed is:

1. A low refractive index resin composition for two photon polymerization (TPP) nano 3D printing, comprising:

30 to 70 wt % of perfluoro ether oligomer;

8 to 30 wt % of fluorinated monomer;

10 to 40 wt % of fluorinated (meth)acrylate oligomer; and 0.5 to 2.0 wt % of photoinitiator for TPP reaction.

2. The low refractive index resin composition of claim 1, wherein the perfluoro ether oligomer has a structure of [Formula 1] below

[Formula 1]

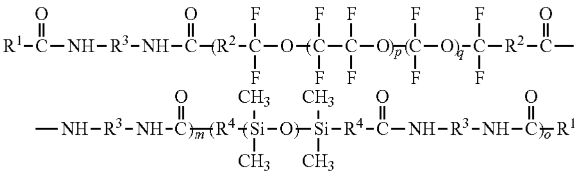

Where, $R^1$ is each independently a (meth)acrylate group having a hydrocarbon ($CH_2$) number of 2 to 10, $R^2$ is each independently —$CH_2O$— or —$CH_2(OCH_2CH_2)_aO$— (a is an integer from 1 to 3), $R^3$ is an aromatic or aliphatic hydrocarbon group having 6 to 20 carbon atoms, $R^4$ is each independently —$CH_2$—, —$CH_2CH_2$— or —$CH_2(OCH_2CH_2)_a$— (a is an integer from 1 to 10), m, o, p, q, and r are repeating numbers for each repeating unit, m and o are 1 to 6, r is 1 to 5,000, p is 1 to 20, and a ratio p/q of p to q ranges from 0.8 to 2.5.

3. The low refractive index resin composition of claim 1, wherein the fluorinated monomer has a fluorine content of 30 to 60 wt %.

4. The low refractive index resin composition of claim 3, wherein the fluorinated monomer is selected from the group consisting of 2,2,2-trifluoroethyl acrylate, 2,2,2-trifluoroethyl methacrylate, 2,2,3,3-2,2,3,3,3-pentafluoropropyl methacrylate, 2,2,3,3-tetrafluoropropyl methacrylate, 2,2,3, 3,3-pentafluoropropyl methacrylate, 1H,1H,5H-octafluoropentyl acrylate, 1H,1H,5H-octafluoropentyl methacrylate, 1,1,1,3,3,3-hexafluoroisopropyl acrylate, 2,2,3,4,4,4-hexafluorobutyl methacrylate, 1,1,1,3,3,3-hexafluoroisopropyl methacrylate, 2,2,3,3,4,4,4-heptafluorobutyl methacrylate, 1H,1H,2H,2H-nonafluorohexyl acrylate, 1H,1H,2H,2H-nonafluorohexyl methacrylate, 2,2,3,3,4,4,5,5,6,6,7,7-dodecafluoroheptyl acrylate, 2,2,3,3,4,4,5,5,6,6,7,7-dodecafluoroheptyl methacrylate, 1H,1H,2H,2H-tridecafluoro-n-octyl acrylate, H,1H,2H,2H-tridecafluoro-n-octyl methacrylate, and 1,6-bis(acryloyloxy)-2,2,3,3,4,4,5,5-octafluorohexane.

5. The low refractive index resin composition of claim 1, wherein the photoinitiator for the TPP reaction is selected from the group consisting of a bis-triazole-based initiator, a benzylamine-based initiator, an aminostyryl-triazines-based initiator, an imidazole-based initiator, a benzyl morpholino phenyl-based initiator, a bengal-based initiator, an erythrosine-based initiator, an isopropylthioxan-based initiator, a thienyl coumarin-based initiator, and a diphenyl phosphine-based initiator.

6. The low refractive index resin composition of claim 1, wherein the fluorinated (meth)acrylate oligomer has a structure of [Formula 5] below

[Formula 5]

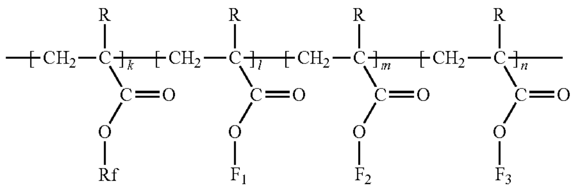

Where, k, l, m, and n are constants, each having a value between 0 and 10,000,

R is —H, —$CH_3$, or a hydrocarbon group having 20 or less carbon atoms, $R_f$ is a fluorocarbon group having 2 to 40 carbon atoms including fluorocarbons (—$CF_2$—, —$CF_3$), $F_1$ is a hydrocarbon group having 2 to 40 carbon atoms and containing at least one (meth)acrylate, vinyl or epoxy reactive group, $F_2$ is a silane containing 1 to 3 methoxy reactive groups (—$OCH_3$) or ethoxy reactive groups (—$OCH_2CH_3$), and $F_3$ is a hydrocarbon group that does not react with a urethane bonding reaction and has 2 to 40 carbon atoms, and is a hydrocarbon group in which a part of the bonded hydrogen (H) is substituted with oxygen (O) or nitrogen (N).

7. The low refractive index resin composition of claim 6, wherein a molar ratio of k, l, m, and n is adjusted in a range of 60 to 80% for k, 2 to 20% for l, 2 to 10% for m, and 2 to 20% for n, respectively.

8. A low refractive index resin composition for two photon polymerization (TPP) nano 3D printing, comprising:

30 to 70 wt % of fluorinated siloxane oligomer having a structure of [Formula 2] below;

8 to 30 wt % of fluorinated monomer;

10 to 40 wt % of fluorinated (meth)acrylate oligomer; and 0.5 to 2.0 wt % of photoinitiator for TPP reaction

[Formula 2]

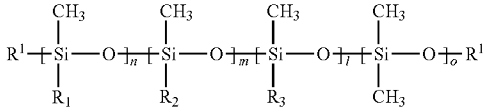

Where, $R^1$ is each independently a (meth)acrylate group having a hydrocarbon ($CH_2$) number of 2 to 10, $R^2$ is a hydrogenated carbon group or a fluorinated carbon group having 2 to 20 carbon atoms, $R^3$ is an alkoxysilane group having 1 to 5 silicon atoms l, m, n, and o are repeating numbers for each repeating unit, all ranging from 1 to 5,000.

* * * * *